(12) United States Patent
Sun et al.

(10) Patent No.: US 10,667,291 B2
(45) Date of Patent: May 26, 2020

(54) UPLINK RETRANSMITTED DATA SENDING METHOD, APPARATUS, AND SYSTEM

(71) Applicant: Huawei Technologies Co., Ltd., Shenzhen, Guangdong (CN)

(72) Inventors: Hao Sun, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/015,894

(22) Filed: Jun. 22, 2018

(65) Prior Publication Data

US 2018/0302919 A1    Oct. 18, 2018

Related U.S. Application Data

(63) Continuation of application No. PCT/CN2016/111370, filed on Dec. 21, 2016.

(30) Foreign Application Priority Data

Dec. 24, 2015    (CN) .......................... 2015 1 0988666

(51) Int. Cl.
*H04W 72/14*    (2009.01)
*H04W 74/08*    (2009.01)
(Continued)

(52) U.S. Cl.
CPC .......... *H04W 72/14* (2013.01); *H04L 1/1887* (2013.01); *H04L 5/0044* (2013.01);
(Continued)

(58) Field of Classification Search
CPC ... H04W 72/14; H04W 72/042; H04W 74/08; H04L 5/0055; H04L 5/0051; H04L 1/1887

See application file for complete search history.

(56) References Cited

U.S. PATENT DOCUMENTS

| 6,847,626 B1 * | 1/2005 | Carneal ................. H04L 1/1867 370/345 |
| 2011/0199961 A1 * | 8/2011 | Narasimha .......... H04W 74/006 370/328 |

(Continued)

FOREIGN PATENT DOCUMENTS

| CN | 102088775 A | 6/2011 |
| CN | 102111252 A | 6/2011 |

(Continued)

OTHER PUBLICATIONS

Office Action issued in Chinese Application No. 201510988666.7 dated Feb. 28, 2020, 7 pages.

*Primary Examiner* — Christine Ng

(74) *Attorney, Agent, or Firm* — Fish & Richardson P.C.

(57) ABSTRACT

The present disclosure discloses an uplink retransmitted data sending method, apparatus, and system, and relates to the field of communications technologies. The method includes: receiving data transmitted on a same contention resource by different user equipments (UEs) that are in a same contention resource group; demodulating, based on a demodulation reference signal DMRS sequence carried in the data, the data sent by the UEs; and when demodulation of data sent by at least two UEs fails, scheduling, by using an uplink grant (UL-grant), the UEs whose data fails to be demodulated, to retransmit the data on a designated non-contention resource. This resolves a prior-art technical problem that uplink data retransmission fails, and improves uplink data retransmission efficiency.

8 Claims, 7 Drawing Sheets

(51) Int. Cl.
    *H04L 5/00*          (2006.01)
    *H04L 1/18*          (2006.01)
    *H04W 72/04*        (2009.01)

(52) U.S. Cl.
    CPC ......... *H04L 5/0085* (2013.01); *H04W 72/042* (2013.01); *H04W 74/08* (2013.01); *H04L 5/0051* (2013.01); *H04L 5/0055* (2013.01)

(56) References Cited

U.S. PATENT DOCUMENTS

| | | |
|---|---|---|
| 2011/0249632 A1 | 10/2011 | Eriksson et al. |
| 2012/0213196 A1* | 8/2012 | Chung ................... H04B 1/713 370/330 |
| 2012/0236816 A1 | 9/2012 | Park et al. |
| 2013/0022012 A1 | 1/2013 | Lee et al. |
| 2014/0010067 A1 | 1/2014 | Guan et al. |
| 2018/0145795 A1* | 5/2018 | Yi .......................... H04W 28/04 |
| 2018/0176903 A1* | 6/2018 | Lee ........................... H04L 1/18 |
| 2018/0279340 A1* | 9/2018 | Skordeman ............ H04W 16/14 |

FOREIGN PATENT DOCUMENTS

| | | |
|---|---|---|
| CN | 102158981 A | 8/2011 |
| CN | 102651679 A | 8/2012 |

\* cited by examiner

UPLINK RETRANSMITTED DATA SENDING METHOD, APPARATUS, AND SYSTEM

CROSS-REFERENCE TO RELATED APPLICATIONS

This application is a continuation of International Application No. PCT/CN2016/111370, filed on Dec. 21, 2016, which claims priority to Chinese Patent Application No. 201510988666.7, filed on Dec. 24, 2015. The disclosures of the aforementioned applications are hereby incorporated by reference in their entireties.

TECHNICAL FIELD

The present disclosure relates to the field of communications technologies, and in particular, to an uplink retransmitted data sending method, apparatus, and system.

BACKGROUND

Currently, in a Long Term Evolution (LTE) system, uplink data and downlink data are scheduled by using a physical downlink control channel (PDCCH) or an enhanced physical downlink control channel (E-PDCCH) in a one-to-one scheduling manner. With development of communications technologies, an increase in a quantity of user connections and an increase in a quantity of potential concurrent access users pose a challenge to a control channel capacity. How control channel overheads are optimized becomes an important research direction.

An uplink contention transmission solution in which group-based scheduling is performed can effectively reduce scheduling signaling overheads. In the solution, by using a contention-based grant (CB-Grant), a base station schedules a plurality of user equipments (UE) that use a same contention resource, to perform uplink data transmission. To be specific, when scheduling a user group that uses the same contention resource to transmit uplink data, the base station may demodulate a demodulation reference signal (DMRS) sequence in each uplink data to distinguish between data sent by the UEs, so as to reduce scheduling signaling overheads.

During a process of implementing the present disclosure, the inventor finds that the prior art has at least the following problems:

In a user group that contends for a same contention resource, there is a possibility of a transmission conflict due to a problem such as a poor inter-user matching degree for a virtual multiple-input multiple-output (MIMO) technology or poor inter-user DMRS sequence orthogonality. As a result, a base station cannot distinguish between data sent by UEs, and uplink data transmission fails. In this contention-based transmission mechanism, UE that fails in transmitting uplink data needs to retransmit the data on an original resource. In this case, a conflict still occurs in uplink data retransmission, and consequently the uplink data retransmission fails.

SUMMARY

To resolve a prior-art problem that uplink data retransmission fails, this application provides an uplink retransmitted data sending method, apparatus, and system. The technical solutions are as follows.

According to a first aspect, an uplink retransmitted data sending method is provided, and is applied to a base station. The method includes: receiving data transmitted on a same contention resource by different user equipments (UEs) that are in a same contention resource group; demodulating, based on a demodulation reference signal DMRS sequence carried in the data, the data sent by the UEs; and when demodulation of data sent by at least two UEs fails, scheduling, by using an uplink grant (UL-grant), the UEs whose data fails to be demodulated, to retransmit the data on a designated non-contention resource.

The base station demodulates, based on the DMRS sequence carried in the data, the data sent by the UEs; and when demodulation of the data sent by the at least two UEs fails, the base station schedules, by using the uplink grant (UL-grant), the UEs whose data fails to be demodulated, to retransmit the data on the designated non-contention resource. When the base station fails in demodulating the data sent by the at least two UEs, it indicates that a failure of demodulating the data of the UEs is caused by a conflict. In this case, the base station schedules the at least two UEs to retransmit the data on the non-contention resource. This resolves a prior-art technical problem that uplink data retransmission fails, avoids a case in which many times of subsequent retransmission fail because of a conflict, and improves uplink data retransmission efficiency.

Optionally, the scheduling, by using a UL-grant, the UEs whose data fails to be demodulated, to retransmit the data on a designated non-contention resource includes: for each UE whose data fails to be demodulated, sending a UL-grant corresponding to the UE, where the UL-grant corresponding to the UE carries preset information that can be uniquely identified by the UE and the non-contention resource designated for the UE.

When uplink data transmission fails because of a conflict, the base station sends, to each UE that fails in transmission, the UL-grant corresponding to the UE, so that the UE can retransmit the data on the non-contention resource indicated by the UL-grant.

Optionally, the method further includes: when demodulation of data sent only by one UE fails, sending a negative acknowledgment to the UE, where the negative acknowledgment is used to trigger the UE to retransmit the data on the contention resource indicated by a contention-based grant (CB-grant) delivered by the base station.

When the base station fails in demodulating the data sent only by the one UE, it indicates that a failure of demodulating the data sent by the UE is caused by relatively poor channel quality. In this case, the base station schedules, by using the CB-grant, the UE to retransmit the data on the contention resource. This ensures correct uplink data transmission and reduces resource occupation.

Optionally, the method further includes: configuring DMRS sequences that are orthogonal to each other for the UEs in the same contention resource group; and scheduling the UEs in the same contention resource group by using the CB-grant, where the CB-grant includes the designated contention resource.

The base station configures the DMRS sequences that are orthogonal to each other for the UEs in the same contention resource group, so that when receiving the data sent by the UEs, the base station can identify the UEs based on the DMRS sequences, and demodulate, based on the DMRS sequences, the data sent by the UEs.

According to a second aspect, an uplink retransmitted data sending method is provided, and is applied to UE. The method includes: sending data to a base station on a contention resource allocated by the base station, where the contention resource is a time-frequency resource that is designated when the base station schedules UEs in a contention resource group by using a contention-based grant CB-grant; after the data is sent, performing blind detection on an uplink grant (UL-grant); and after a UL-grant is found through blind detection, retransmitting the data on a non-contention resource indicated by the UL-grant.

The UE sends the data to the base station on the contention resource allocated by the base station; after sending the data, the UE performs blind detection on the UL-grant; and after finding the UL-grant through blind detection, the UE retransmits the data on the non-contention resource indicated by the UL-grant. When the UE finds the UL-grant through blind detection, it indicates that uplink data transmission performed by the UE fails and the failure is caused by a conflict with another UE. In this case, the UE needs to retransmit, based on the UL-grant delivered by the base station, the data on the non-contention resource indicated by the UL-grant. This resolves a prior-art technical problem that uplink data retransmission fails, avoids a case in which many times of subsequent retransmission fail because of a conflict, and improves uplink data retransmission efficiency.

Optionally, the performing blind detection on a UL-grant includes: extracting preset information from the UL-grant, where the preset information is configured by the base station as information that can be successfully identified only by one UE; identifying the preset information in a preset manner; and after the preset information is successfully identified, determining that the UL-grant is successfully found through blind detection.

The preset information in the UL-grant is identified; and if the preset information is successfully identified, it is determined that the UL-grant is successfully found through blind detection. The preset information can be successfully identified only by one UE. If the UE identifies the preset information, it indicates that the UL-grant carrying the preset information is to be sent to the UE. Therefore, it can be ensured that the UE can successfully find, through blind detection, only the UL-grant to be sent to the UE.

Optionally, the method further includes: after the data is sent, detecting whether a UL-grant sent by the base station is found through blind detection; if the UL-grant sent by the base station is not found through blind detection, continuing to detect whether a positive acknowledgment that is corresponding to the UE and that is fed back by the base station is received; and if the positive acknowledgment that is corresponding to the UE and that is fed back by the base station is not received, retransmitting the data on the resource indicated by the CB-grant delivered by the base station.

After the UE does not find through blind detection the UL-grant sent by the base station and does not receive the positive acknowledgment that is corresponding to the UE and that is fed back by the base station, the UE retransmits the data on the resource indicated by the CB-grant delivered by the base station. When the UE does not find through blind detection the UL-grant sent by the base station and does not receive the positive acknowledgment that is corresponding to the UE and that is fed back by the base station, it indicates that data transmission performed by the UE fails and the transmission failure is not caused by a conflict. In this case, the UE may retransmit the data on the resource indicated by the CB-grant delivered by the base station. This ensures that data failing to be transmitted can be retransmitted, and increases a data transmission success rate.

Optionally, the retransmitting the data on the resource indicated by the CB-grant delivered by the base station includes: obtaining an effective time of a last CB-grant received from the base station; and if a current moment does not exceed the effective time, retransmitting the data on the contention resource; or if a current moment exceeds the effective time, waiting for a next CB-grant sent by the base station, and after the next CB-grant is received, retransmitting the data on a resource indicated by the next CB-grant.

According to a third aspect, an uplink retransmitted data sending apparatus is provided, and is applied to a base station. The apparatus includes several units, and the several units are configured to perform the steps of the uplink retransmitted data sending method that is provided in any one of the first aspect or the possible implementations of the first aspect.

According to a fourth aspect, an uplink retransmitted data sending apparatus is provided, and is applied to user equipment. The apparatus includes several units, and the several units are configured to perform the steps of the uplink retransmitted data sending method that is provided in any one of the second aspect or the possible implementations of the second aspect.

According to a fifth aspect, a base station is provided. The base station includes a processor, and a memory and a network interface that are connected to the processor, where the processor is configured to implement the steps of the uplink retransmitted data sending method in the first aspect.

According to a sixth aspect, user equipment is provided. The user equipment includes a processor, and a memory and a network interface that are connected to the processor, where the processor is configured to implement the steps of the uplink retransmitted data sending method in the second aspect.

According to a seventh aspect, an uplink retransmitted data sending system is provided. The system includes a base station and user equipment, where the base station includes the uplink retransmitted data sending apparatus provided in the third aspect, and the user equipment includes the uplink retransmitted data sending apparatus provided in the fourth aspect.

According to an eighth aspect, a computer-readable medium is provided, and is applied to a base station. The computer-readable medium stores an executable program for implementing the uplink retransmitted data sending method that is provided in any one of the first aspect or the possible implementations of the first aspect.

According to a ninth aspect, a computer-readable medium is provided, and is applied to user equipment. The computer-readable medium stores an executable program for implementing the uplink retransmitted data sending method that is provided in any one of the second aspect or the possible implementations of the second aspect.

DESCRIPTION OF EMBODIMENTS

To make the objectives, technical solutions, and advantages of the present disclosure clearer, the following further describes the embodiments of the present disclosure in detail with reference to the accompanying drawings.

A "module" mentioned in this specification is a program or an instruction that is stored in a memory and that can implement some functions. A "unit" mentioned in this specification is a functional structure obtained through logical division. The "unit" may be implemented by only hardware, or implemented by a combination of software and hardware.

Figure 1:
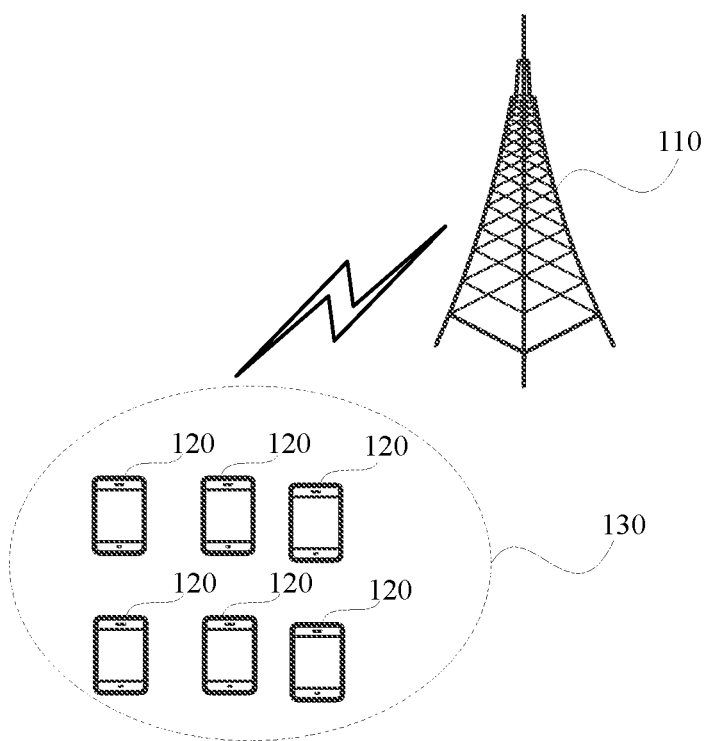
FIG. 1 is a schematic structural diagram of an uplink retransmitted data sending system according to an example embodiment of the present disclosure.

Referring to FIG. 1, FIG. 1 is a schematic structural diagram of an uplink retransmitted data sending system according to an example embodiment of the present disclosure. The data transmission system includes at least one base station 110 and at least one user equipment 120.

The base station 110 and the user equipment 120 are in the data transmission system. The base station 110 sends a CB-grant to each user equipment 120 in a contention resource user group 130 at a preset time interval, so that the user equipment 120 in the contention resource user group sends data on a contention resource indicated by the CB-grant. The contention resource mentioned herein is a wireless time-frequency resource allocated by the base station 110 to the contention resource user group. All UEs in the contention resource user group can send data on the contention resource.

Figure 2:
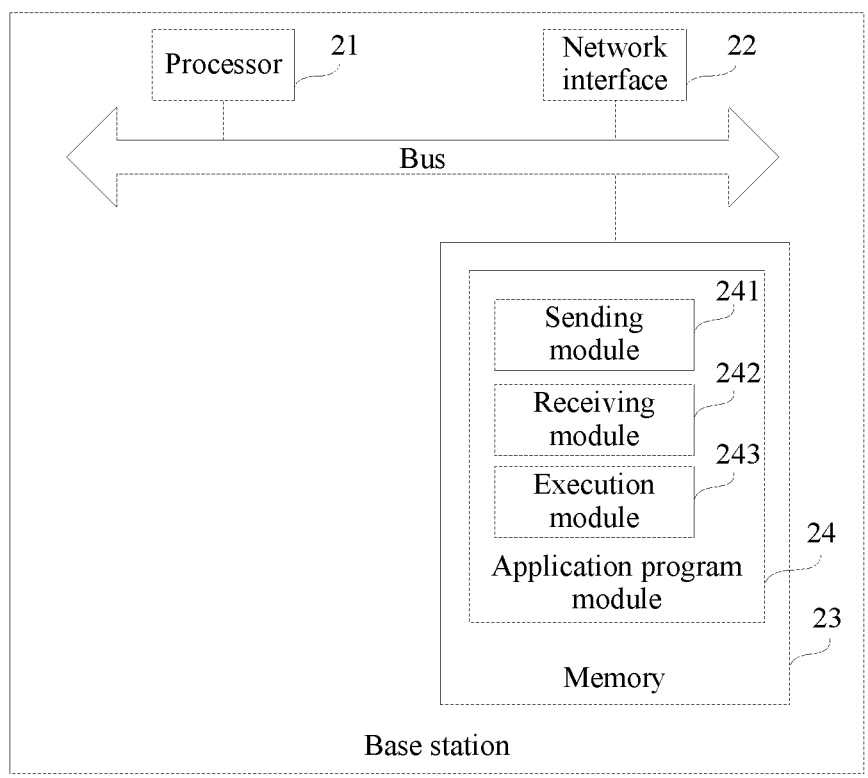
FIG. 2 is a schematic structural diagram of a base station according to an example embodiment of the present disclosure.

Referring to FIG. 2, FIG. 2 is a schematic structural diagram of a base station 110 according to an example embodiment of the present disclosure. The base station 110 includes a processor 21, a network interface 22, and a memory 23.

The processor 21 includes at least one processing core. The processor 21 performs various application functions and data processing by running a software program and a module.

There may be a plurality of network interfaces 22. Some network interfaces 22 are configured to communicate with UE.

The memory 23 is connected to the processor 21, for example, the memory 23 may be connected to the processor 21 by using a bus. The memory 23 may be configured to store the software program and the module.

The memory 23 may store an application program module 24 required by at least one function. The application program module 24 may include a sending module 241, a receiving module 242, and an execution module 243.

The sending module 241, the receiving module 242, and the execution module 243 mentioned herein can perform corresponding steps in FIG. 5, FIG. 6A, FIG. 6B, and FIG. 6C. For details, refer to descriptions of FIG. 5, FIG. 6A, FIG. 6B, and FIG. 6C.

The memory 23 may be implemented by any type of volatile or non-volatile storage device or a combination thereof, for example, a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that the structure of the base station 110 shown in FIG. 2 does not constitute any limitation on the base station 110. The base station 110 may include more or fewer parts than those shown in the figure, a combination of some parts, or parts disposed differently.

Figure 3:
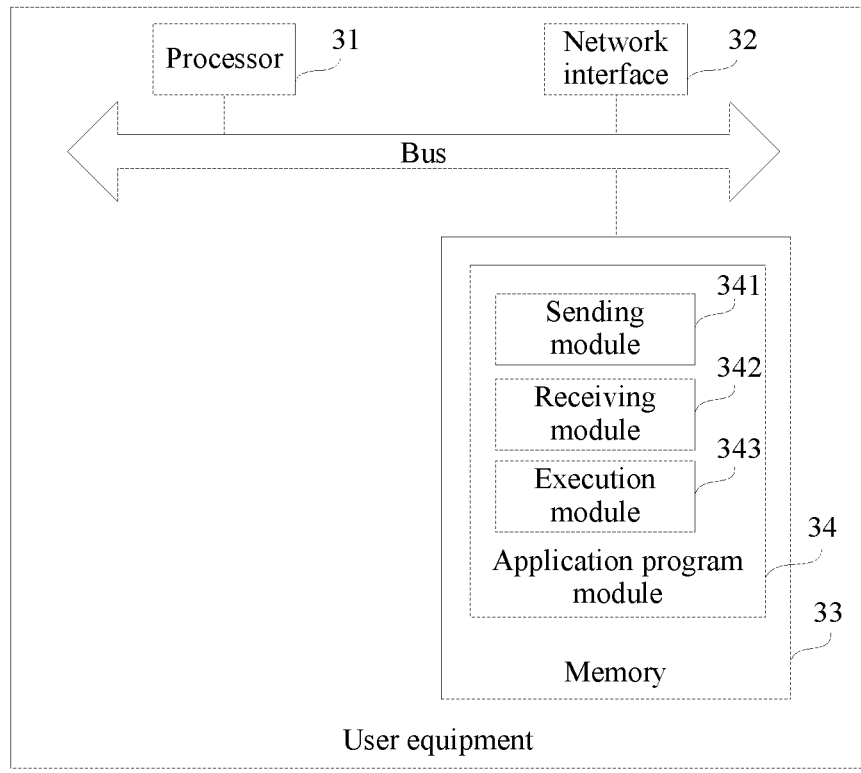
FIG. 3 is a schematic structural diagram of user equipment according to an example embodiment of the present disclosure.

Referring to FIG. 3, FIG. 3 is a schematic structural diagram of user equipment 120 according to an example embodiment of the present disclosure. The user equipment 120 includes a processor 31, a network interface 32, and a memory 33.

The processor 31 includes at least one processing core. The processor 31 performs various function applications and data processing by running a software program and a module.

There may be a plurality of network interfaces 32. Some network interfaces 32 are configured to communicate with a base station.

The memory 33 is connected to the processor 31, for example, the memory 33 may be connected to the processor 31 by using a bus. The memory 33 may be configured to store the software program and the module.

The memory 33 may store an application program module 34 required by at least one function. The application program module 34 may include a sending module 341, a receiving module 342, and an execution module 343.

The sending module 341, the receiving module 342, and the execution module 343 mentioned herein can perform corresponding steps in FIG. 5, FIG. 6A, FIG. 6B, and FIG. 6C. For details, reference is made to descriptions of FIG. 5, FIG. 6A, FIG. 6B, and FIG. 6C.

The memory 33 may be implemented by any type of volatile or non-volatile storage device or a combination thereof, for example, a static random-access memory, an electrically erasable programmable read-only memory, an erasable programmable read-only memory, a programmable read-only memory, a read-only memory, a magnetic memory, a flash memory, a magnetic disk, or an optical disc.

A person skilled in the art may understand that the structure of the user equipment 120 shown in FIG. 3 does not constitute any limitation on the user equipment 120. The user equipment 120 may include more or fewer parts than those shown in the figure, a combination of some parts, or parts disposed differently.

Figure 4:
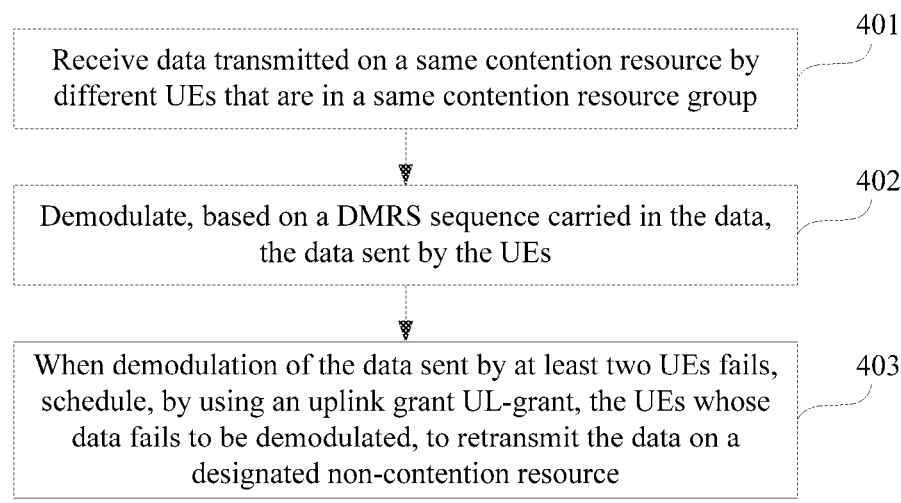
FIG. 4 is a flowchart of an uplink retransmitted data sending method according to an example embodiment of the present disclosure.

Referring to FIG. 4, FIG. 4 is a flowchart of an uplink retransmitted data sending method according to an example embodiment of the present disclosure. This embodiment provides descriptions by using an example in which the method is applied to the base station shown in FIG. 1. The processor 21 of the base station 110 shown in FIG. 1 performs the following steps. The method includes the following several steps.

Step 401: Receive data transmitted on a same contention resource by different UEs that are in a same contention resource group.

Step 402: Demodulate, based on a DMRS sequence carried in the data, the data sent by the UEs.

Step 403: When demodulation of data sent by at least two UEs fails, schedule, by using an uplink grant (UL-grant), the UEs whose data fails to be demodulated, to retransmit the data on a designated non-contention resource.

In conclusion, according to the uplink retransmitted data sending method provided in this embodiment disclosed in the present disclosure, the base station demodulates, based on the DMRS sequence carried in the data, the data sent by the UEs; and when demodulation of the data sent by the at least two UEs fails, the base station schedules, by using the UL-grant, the UEs whose data fails to be demodulated, to retransmit the data on the designated non-contention resource. When the base station fails in demodulating the data sent by the at least two UEs, it indicates that a failure of demodulating the data of the UEs is caused by a conflict. When uplink data transmission fails because of the conflict, the base station schedules the at least two UEs to retransmit the data on the non-contention resource. This resolves a prior-art technical problem that uplink data retransmission fails, avoids a case in which many times of subsequent retransmission fail because of a conflict, and improves uplink data retransmission efficiency.

Figure 5:
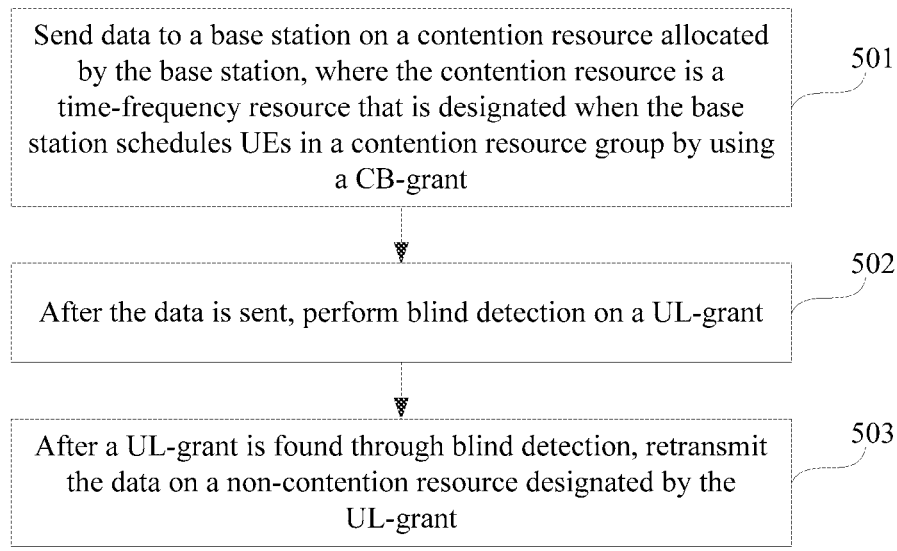
FIG. 5 is a flowchart of an uplink retransmitted data sending method according to another example embodiment of the present disclosure.

Referring to FIG. 5, FIG. 5 is a flowchart of an uplink retransmitted data sending method according to another example embodiment of the present disclosure. This embodiment provides descriptions by using an example in which the method is applied to the user equipment shown in FIG. 1. The processor 31 of the user equipment 120 shown in FIG. 1 performs the following steps. The method includes the following several steps.

Step 501: Send data to abase station on a contention resource allocated by the base station, where the contention resource is a time-frequency resource that is designated when the base station schedules UEs in a contention resource group by using a CB-grant.

Step 502: After the data is sent, perform blind detection on a UL-grant.

Step 503: After a UL-grant is found through blind detection, retransmit the data on a non-contention resource indicated by the UL-grant.

In conclusion, according to the uplink retransmitted data sending method provided in this embodiment disclosed in the present disclosure, the UE sends the data to the base station on the contention resource allocated by the base station; after sending the data, the UE performs blind detection on the UL-grant; and after finding the UL-grant through blind detection, the UE retransmits the data on the non-contention resource indicated by the UL-grant. When the UE finds the UL-grant through blind detection, it indicates that uplink data transmission performed by the UE fails and the failure is caused by a conflict with another UE. In this case, the UE needs to retransmit, based on the UL-grant delivered by the base station, the data on the non-contention resource indicated by the UL-grant. This resolves a prior-art technical problem that uplink data retransmission fails, avoids a case in which many times of subsequent retransmission fail because of a conflict, and improves uplink data retransmission efficiency.

To ensure that the base station accurately identifies UEs in a same contention resource group, during a process of accessing the base station by the UEs, the base station configures DMRS sequences that are orthogonal to each other for the UEs in the same contention resource group. It should be noted that the base station configures only a unique DMRS sequence for each UE. In this way, when receiving data transmitted by UE, the base station can determine, based on a DMRS sequence carried in the data, the UE sending the data.

Figure 6A:
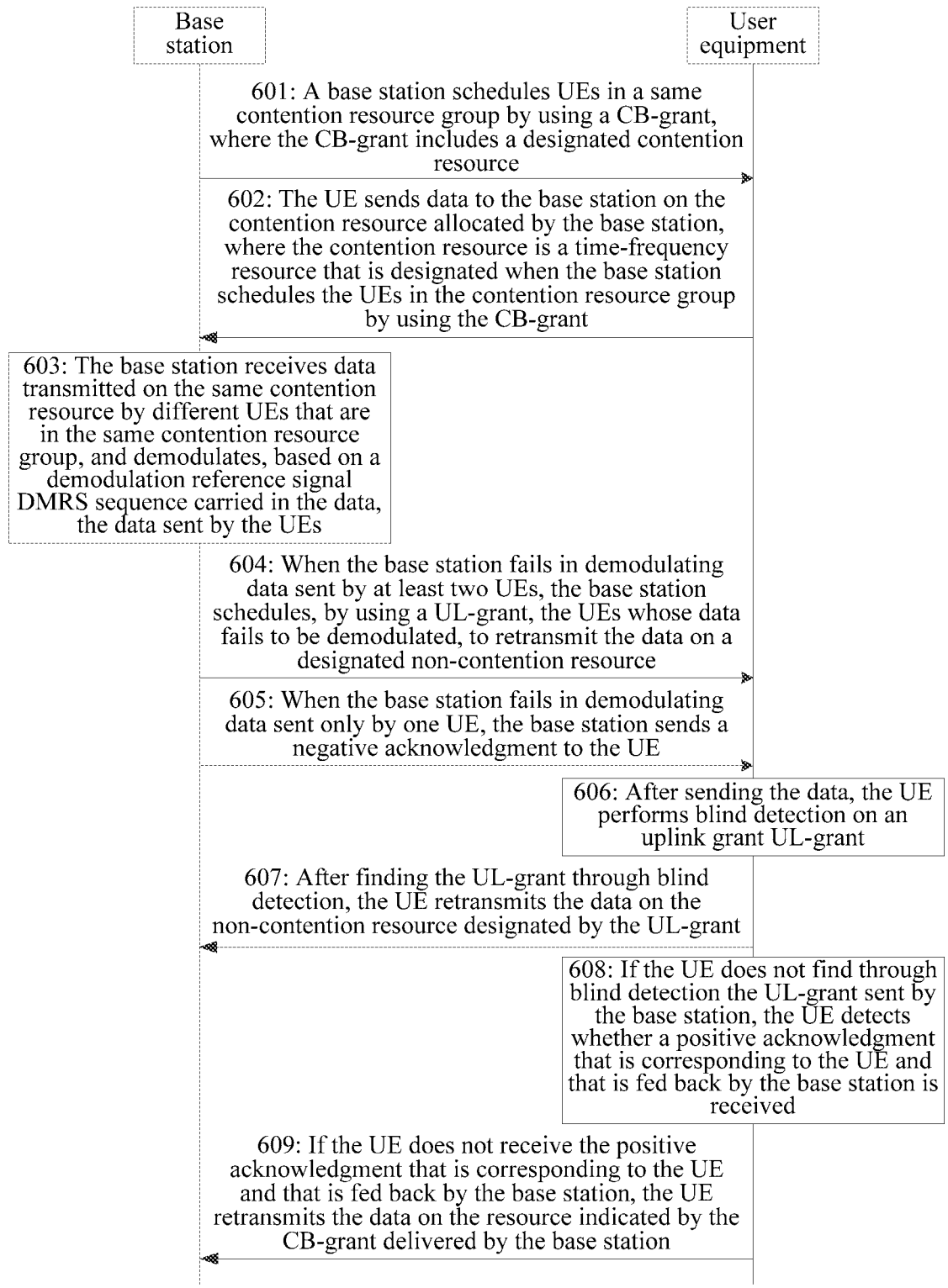
FIG. 6A is a flowchart of an uplink retransmitted data sending method according to still another example embodiment of the present disclosure.

Referring to FIG. 6A, FIG. 6A is a flowchart of an uplink retransmitted data sending method according to still another example embodiment of the present disclosure. This embodiment provides descriptions by using an example in which the method is applied to the base station 110 and the user equipment 120 that are shown in FIG. 1. The processor 21 of the base station 110 shown in FIG. 2 or the processor 31 of the user equipment 120 shown in FIG. 2 performs the following steps. The method includes the following several steps.

Step 601: The base station schedules UEs in a same contention resource group by using a CB-grant, where the CB-grant includes a designated contention resource.

The CB-grant is downlink control information carried on a PDCCH or an E-PDCCH, and is used to transmit information that is required when the UEs send uplink data. The CB-grant includes contention resource information, a modulation and coding scheme, and the like. The contention resource information is information about a time-frequency resource that is used for uplink data transmission and that is allocated by the base station for a user group in the contention resource group.

The base station sends a CB-grant to the UEs in the contention resource group at a preset time interval, so that after receiving the CB-grant, UE that needs to send data sends the data on the contention resource indicated by the CB-grant.

Step 602: The UE sends data to the base station on the contention resource allocated by the base station, where the contention resource is a time-frequency resource that is designated when the base station schedules the UEs in the contention resource group by using the CB-grant.

The UE stores to-be-sent data to a buffer, and monitors the CB-grant sent by the base station. When receiving the CB-grant, the UE sends the data on the contention resource designated by the CB-grant. It should be noted that the data sent by the UE on the contention resource carries a DMRS sequence configured by the base station for the UE. In this way, when receiving data sent by a plurality of UEs in the same contention group, the base station can identify, based on the DMRS sequence, the data sent by the UE.

Step 603: The base station receives data transmitted on the same contention resource by different UEs that are in the same contention resource group, and demodulates, based on a demodulation reference signal DMRS sequence carried in the data, the data sent by the UEs.

For data transmitted on a same resource by different UEs, the base station needs to detect and identify DMRS sequences in fixed timing of the data. The base station can determine, based on the identified DMRS sequences, the UEs sending the data, and demodulate, based on the identified DMRS sequences, the data.

It should be noted that, because DMRS sequences of a plurality of UEs are transmitted in same timing, when receiving the DMRS sequences of the plurality of UEs in a resource contention group, based on the DMRS sequences, the base station identifies the UEs in the resource contention group, and demodulates the data sent by the identified UEs. When the base station demodulates, based on the DMRS sequences, the data sent by the UEs, because of relatively poor DMRS orthogonality, mutual interference may occur during demodulation of the data sent by the UEs. As a result, the base station fails in demodulating the data sent by the UEs. In another possible case, because of relatively poor DMRS sequence orthogonality of the UEs in the resource contention group, the base station cannot identify the UEs sending the data. As a result, the base station cannot demodulate the data sent by the UEs.

Step 604: When the base station fails in demodulating data sent by at least two UEs, the base station schedules, by using a UL-grant, the UEs whose data fails to be demodulated, to retransmit the data on a designated non-contention resource.

When the base station fails in demodulating the data sent by the at least two UEs, it indicates that a failure of demodulating the data of the at least two UEs is caused by a conflict. The conflict mentioned herein means that the base station cannot successfully identify the data sent by the UEs. When the base station fails in demodulating the data sent by the at least two UEs, if a CB-grant is still used to schedule the at least two UEs to retransmit the data on the contention resource, the base station still cannot successfully identify the data sent by the UEs, and a conflict still occurs in uplink data retransmission performed by the at least two UEs. As a result, uplink data transmission performed by the at least two UEs fails, and even transmission of initially transmitted data of another user in the contention resource group may be further affected.

Therefore, in this embodiment, when the base station fails in demodulating the data sent by the at least two UEs, for each UE whose data fails to be demodulated, the base station sends a UL-grant corresponding to the UE. The UL-grant corresponding to the UE carries scheduling information such as preset information that can be uniquely identified by the UE, the non-contention resource designated for the UE, and a modulation and coding scheme (MCS). In this case, the UE can identify, based on the preset information, the UL-grant used for scheduling the UE, and retransmit the data on the non-contention resource indicated by the UL-grant.

Step 605: When the base station fails in demodulating data sent only by one UE, the base station sends a negative acknowledgment to the UE.

When the base station fails in demodulating the data sent only by the one UE, it indicates that a failure of demodulating the data of the UE is caused by poor channel quality. In this case, the base station sends the negative acknowledgment to the UE, to trigger the UE to retransmit, after receiving the negative acknowledgment, the data on the contention resource designated by the CB-grant. In addition, when receiving the retransmitted data of the user, the base station increases a retransmitted data demodulation success rate by using technologies such as power control/hybrid automatic repeat request (HARQ).

Optionally, the base station usually sends the negative acknowledgment to the UE in a preset timeslot.

Step 606: After sending the data, the UE performs blind detection on an uplink grant (UL-grant).

Figure 6B:
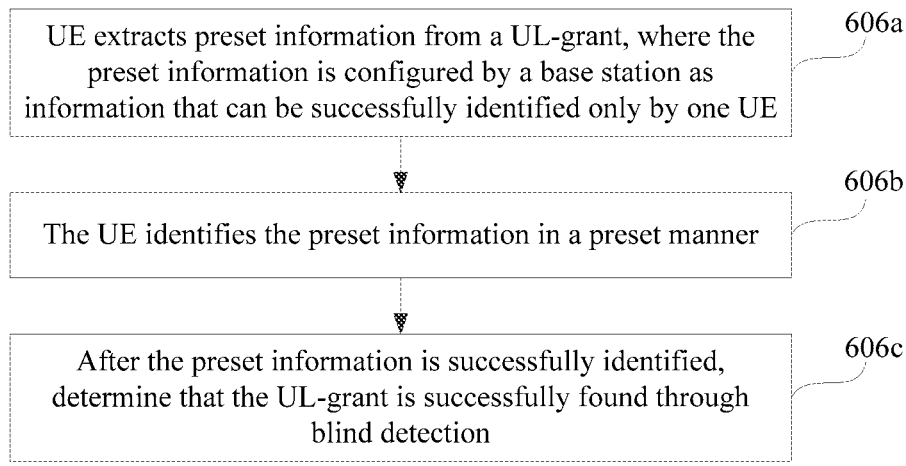
FIG. 6B is a flowchart of a UL-grant blind detection method according to an example embodiment of the present disclosure.

Optionally, the step of performing blind detection on a UL-grant may be implemented in several sub-steps shown in FIG. 6B.

Step 606a: The UE extracts preset information from a UL-grant, where the preset information is configured by the base station as information that can be successfully identified only by one UE.

Step 606b: The UE identifies the preset information in a preset manner.

Step 606c: After the preset information is successfully identified, determine that the UL-grant is successfully found through blind detection.

Step 607: After finding the UL-grant through blind detection, the UE retransmits the data on the non-contention resource indicated by the UL-grant.

If the UE finds the UL-grant through blind detection, it indicates that the base station considers that a failure of data transmission performed by the UE is caused by a conflict that occurs during data demodulation. To avoid a conflict that occurs again when the UE retransmits the data, the base station instructs, by using the UL-grant, the UE to retransmit the data on the non-contention resource. Correspondingly, the UE transmits the data on the non-contention resource indicated by the UL-grant.

Step 608: If the UE does not find through blind detection the UL-grant sent by the base station, the UE detects whether a positive acknowledgment that is corresponding to the UE and that is fed back by the base station is received.

If the UE does not find through blind detection the UL-grant sent by the base station, it indicates that the UE does not need to retransmit the data in a non-contention area. In this case, the UE needs to detect, in normal timing, acknowledgment information fed back by the base station. If the positive acknowledgment that is corresponding to the UE and that is fed back by the base station is not found, it indicates that data transmission performed by the UE fails, and the UE needs to retransmit the data on the resource indicated by the CB-grant delivered by the base station.

In a first possible case, the base station successfully identifies a DMRS sequence of UE and demodulates, based on the DMRS sequence, data sent by the UE. During demodulation, if the demodulation fails because of relatively poor channel quality or the like, the base station does not send, to the UE, a positive acknowledgment corresponding to the UE. In a second possible case, the base station does not successfully identify a DMRS sequence of UE, and in this case, the base station does not send a positive acknowledgment to the UE either. In the two cases, the UE cannot receive a positive acknowledgment that is corresponding to the UE and that is fed back by the base station, and the UE needs to perform step 609.

Step 609: If the UE does not receive the positive acknowledgment that is corresponding to the UE and that is fed back by the base station, the UE retransmits the data on the resource indicated by the CB-grant delivered by the base station.

Figure 6C:
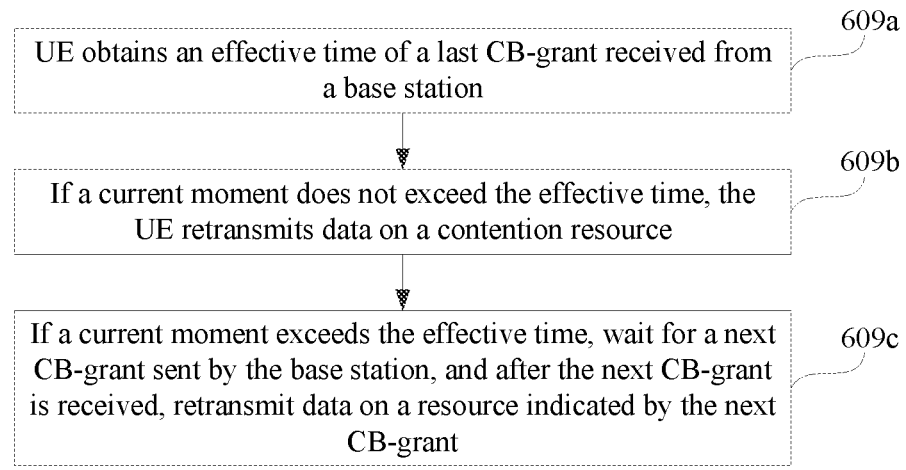
FIG. 6C is a flowchart of a method for retransmitting, by UE, data on a resource indicated by a CB-grant delivered by a base station according to an example embodiment of the present disclosure.

Optionally, this step may be implemented by using several sub-steps shown in FIG. 6C.

Step 609a: The UE obtains an effective time of a last CB-grant received from the base station.

The base station sends a CB-grant at a preset time interval, and each CB-grant sent by the base station is generated based on a current uplink channel status. Therefore, the UE obtains the effective time of the last CB-grant received from the base station, and determines whether to retransmit the data on a resource indicated by the last CB-grant received.

Step 609b: If a current moment does not exceed the effective time, the UE retransmits the data on the contention resource.

If the current moment does not exceed the effective time of the last CB-grant received, the UE may retransmit the data on the contention resource indicated by the last CB-grant received.

Step 609c: If a current moment exceeds the effective time, wait for a next CB-grant sent by the base station, and after the next CB-grant is received, retransmit the data on a resource indicated by the next CB-grant.

If the current moment exceeds the effective time, the UE cannot retransmit the data on the contention resource indicated by the last CB-grant received. The UE needs to wait for the next CB-grant sent by the base station, and after receiving the next CB-grant, retransmit the data on the resource indicated by the next CB-grant.

In conclusion, according to the uplink retransmitted data sending method provided in this embodiment disclosed in the present disclosure, the base station demodulates, based on the demodulation reference signal DMRS sequence carried in the data, the data sent by the UEs; when demodulation of the data sent by the at least two UEs fails, the base station schedules, by using the uplink grant (UL-grant), the UEs whose data fails to be demodulated, to retransmit the data on the designated non-contention resource; and when demodulation of the data sent only by one UE fails, the base station schedules, by using the uplink grant CB-grant, the UE whose data fails to be demodulated, to retransmit the data on the contention resource. When uplink data transmission fails because of a conflict, the base station schedules the UE to retransmit the data on the non-contention resource; when uplink data transmission fails because of poor channel quality, the base station schedules the UE to retransmit the data on the contention resource. This resolves a prior-art technical problem that uplink data retransmission fails, and improves uplink data retransmission efficiency.

Figure 7:
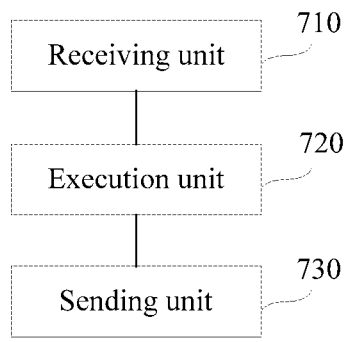
FIG. 7 is a schematic structural diagram of an uplink retransmitted data sending apparatus according to an example embodiment of the present disclosure.

Referring to FIG. 7, FIG. 7 is a block diagram of an uplink retransmitted data sending apparatus according to an embodiment of the present disclosure. The uplink retransmitted data sending apparatus may be implemented as all or a part of a base station by software, hardware, or a combination thereof. This embodiment provides descriptions by using an example in which the apparatus is applied to the base station shown in FIG. 1. The uplink retransmitted data sending apparatus may include a receiving unit 710, an execution unit 720, and a sending unit 730.

The receiving unit 710 is configured to perform a function of step 401.

The execution unit 720 is configured to perform a function of step 402.

The sending unit 730 is configured to perform a function of step 403.

In a possible implementation, in addition to the foregoing functions, the receiving unit 710, the execution unit 720, and the sending unit 730 may have other functions. For example, the receiving unit 710 is further configured to perform a function of step 603, the execution unit 720 is further configured to perform a function of step 603, and the sending unit 730 is further configured to perform functions of steps 601, 604, and 605.

For related details, reference may be made to the foregoing method embodiments.

It should be noted that, when the uplink retransmitted data sending apparatus provided in the foregoing embodiment retransmits uplink data, the division of the foregoing functional modules is merely used as an example for description. In actual application, the foregoing functions may be allocated to different functional modules for implementation based on a requirement, that is, an inner structure of the uplink retransmitted data sending apparatus is divided into different functional modules to implement all or some of the functions described above. In addition, the uplink retransmitted data sending apparatus provided in the foregoing embodiment is based on a same concept as the embodiments of the uplink retransmitted data sending method. For a specific implementation process of the apparatus, reference is made to the method embodiments. Details are not described herein again.

Figure 8A:
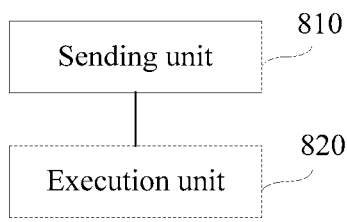
FIG. 8A is a schematic structural diagram of an uplink retransmitted data sending apparatus according to another example embodiment of the present disclosure.

Referring to FIG. 8A, FIG. 8A is a block diagram of an uplink retransmitted data sending apparatus according to another embodiment of the present disclosure. The uplink retransmitted data sending apparatus may be implemented as all or a part of UE by software, hardware, or a combination thereof. This embodiment provides descriptions by using an example in which the apparatus is applied to the UE shown in FIG. 1. The uplink retransmitted data sending apparatus may include a sending unit 810 and an execution unit 820.

The sending unit 810 is configured to perform functions of steps 501 and 503.

The execution unit 820 is configured to perform a function of step 502.

For related details, reference may be made to the foregoing method embodiments.

Figure 8B:
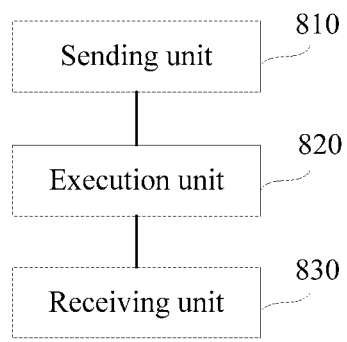
FIG. 8B is a schematic structural diagram of an uplink retransmitted data sending apparatus according to still another example embodiment of the present disclosure.

In a possible implementation, as shown in FIG. 8B, the uplink retransmitted data sending apparatus further includes a receiving unit 830, configured to perform a function of step 603. Moreover, in addition to the foregoing functions, the sending unit 810 and the execution unit 820 may have other functions. For example, the sending unit 810 is further configured to perform functions of steps 602, 607, and 609, and the execution unit 820 is further configured to perform functions of steps 606 and 608.

For related details, reference may be made to the foregoing method embodiments.

It should be noted that, when the uplink retransmitted data sending apparatus provided in the foregoing embodiment retransmits uplink data, the division of the foregoing functional modules is merely used as an example for description. In actual application, the foregoing functions may be allocated to different functional modules for implementation based on a requirement, that is, an inner structure of the uplink retransmitted data sending apparatus is divided into different functional modules to implement all or some of the functions described above. In addition, the uplink retransmitted data sending apparatus provided in the foregoing embodiment is based on a same concept as the embodiments of the uplink retransmitted data sending method. For a specific implementation process of the apparatus, reference is made to the method embodiments. Details are not described herein again.

An example embodiment of this application further provides an uplink retransmitted data sending system. The uplink retransmitted data sending system includes the uplink retransmitted data sending apparatus shown in FIG. 7 and the uplink retransmitted data sending apparatus shown in FIG. 8A, or the uplink retransmitted data sending system includes the uplink retransmitted data sending apparatus shown in FIG. 7 and the uplink retransmitted data sending apparatus shown in FIG. 8B.

The sequence numbers of the foregoing embodiments of this application are merely for descriptive purposes, and are not intended to indicate priorities of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the described apparatus and unit, reference may be made to a corresponding process in the foregoing method embodiments. Details are not described herein again.

In the several embodiments provided in this application, it should be understood that the disclosed apparatuses and methods may be implemented in other manners. For example, the described apparatus embodiments are merely examples. For example, the unit division may merely be logical function division and may be other division in actual implementation. For example, a plurality of units or components may be combined or integrated into another system, or some features may be ignored or not be performed.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of the present disclosure may be integrated into one processing unit, or each of the units may exist alone physically, or at least two units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink retransmitted data sending method, applied to user equipment (UE), the method comprising:
   sending data to a base station on a contention resource allocated by the base station, wherein the contention resource is a time-frequency resource that is designated when the base station schedules UEs in a contention resource group by using a contention-based grant (CB-grant);
   after sending the data, performing blind detection on an uplink grant (UL-grant); and
   in response to not detecting the UL-grant through blind detection:
      detecting whether a positive acknowledgment that is corresponding to the UE and that is fed back by the base station is received; and
      in response to detecting that the positive acknowledgment that is corresponding to the UE and that is fed back by the base station is not received, retransmitting the data on the resource indicated by the CB-grant delivered by the base station.

2. The method according to claim 1, wherein performing blind detection on a UL-grant comprises:
   extracting preset information from the UL-grant, wherein the preset information is configured by the base station as information that can be successfully identified only by one UE;
   identifying the preset information in a preset manner; and
   after the preset information is successfully identified, determining that the UL-grant is successfully found through blind detection.

3. The method according to claim 1, further comprising:
   performing blind detection on a second UL-grant;
   in response to detecting the second UL-grant through blind detection, retransmitting the data on a non-contention resource indicated by the second UL-grant.

4. The method according to claim 1, wherein retransmitting the data on the resource indicated by the CB-grant delivered by the base station comprises:
   obtaining an effective time of a last CB-grant received from the base station;
   when a current moment does not exceed the effective time, retransmitting the data on the contention resource; and
   when a current moment exceeds the effective time, waiting for a next CB-grant sent by the base station, and after receiving the next CB-grant, retransmitting the data on a resource indicated by the next CB-grant.

5. An uplink retransmitted data sending apparatus, applied to user equipment (UE), the apparatus comprising:
   a processor; and
   a non-transitory computer-readable storage medium coupled to the processor and storing programming instructions which, when executed by the processor, cause the apparatus to:
      send data to a base station by using a contention resource allocated by the base station, wherein the contention resource is a time-frequency resource that is designated when the base station schedules UEs in a contention resource group by using a contention-based grant CB-grant;
      after the data is sent, perform blind detection on an uplink grant (UL-grant); and
      in response to not detecting the UL-grant through blind detection:
         detect whether a positive acknowledgment that is corresponding to the UE and that is fed back by the base station is received; and
         in response to detecting that the positive acknowledgment that is corresponding to the UE and that is fed back by the base station is not received, retransmit the data on the resource indicated by the CB-grant delivered by the base station.

6. The apparatus according to claim 5, wherein the programming instructions, when executed by the processor, cause the apparatus to:

extract preset information from the UL-grant, wherein the preset information is configured by the base station as information that can be successfully identified only by one UE;

identify the preset information in a preset manner; and after the preset information is successfully identified, determine that the UL-grant is successfully found through blind detection.

7. The apparatus according to claim 5, wherein the programming instructions, when executed by the processor, cause the apparatus to:

perform blind detection on a second UL-grant;

in response to detecting the second UL-grant through blind detection, retransmit the data on a non-contention resource indicated by the second UL-grant.

8. The apparatus according to claim 5, wherein the programming instructions, when executed by the processor, cause the apparatus to:

obtain an effective time of a last CB-grant received from the base station;

when a current moment does not exceed the effective time, retransmit the data on the contention resource; and when a current moment exceeds the effective time, wait for a next CB-grant sent by the base station, and after the next CB-grant is received, retransmit the data on a resource indicated by the next CB-grant.

\* \* \* \* \*